United States Patent
Nakamura et al.

[11] Patent Number: 5,478,622
[45] Date of Patent: Dec. 26, 1995

[54] MAGNETIC DISK

[75] Inventors: Kouichi Nakamura; Hirotsugu Kodama, both of Kumamoto; Kyoji Noda, Arao, all of Japan

[73] Assignee: Matsushita Electric Industrial Co., Ltd., Osaka, Japan

[21] Appl. No.: 253,831

[22] Filed: Jun. 3, 1994

Related U.S. Application Data

[63] Continuation of Ser. No. 883,439, May 15, 1992, abandoned.

[30] Foreign Application Priority Data

May 16, 1991 [JP] Japan .................. 3-111415

[51] Int. Cl.[6] .................. B05D 5/12; G11B 5/82
[52] U.S. Cl. .................. 428/65.6; 360/135; 428/163; 428/164; 428/409; 428/472.3; 428/694 TS; 428/694 TP; 428/694 TR; 428/694 SG; 428/900
[58] Field of Search .................. 428/64, 163, 164, 428/472.3, 409, 695, 694 SG, 694 TS, 694 TR, 694 TP, 900; 360/135, 131, 133, 132

[56] References Cited

U.S. PATENT DOCUMENTS

| | | | |
|---|---|---|---|
| 4,973,496 | 11/1990 | Kruger | 427/129 |
| 5,070,425 | 12/1991 | Inumochi | 360/135 |
| 5,082,709 | 1/1992 | Suzuki | 428/64 |
| 5,225,955 | 7/1993 | Ito | 360/135 |

FOREIGN PATENT DOCUMENTS

| | | |
|---|---|---|
| 61-51619 | 3/1986 | Japan . |
| 1-273218 | 11/1989 | Japan . |
| 273516 | 3/1990 | Japan . |
| 2-134727 | 5/1990 | Japan . |
| 3125325 | 5/1991 | Japan . |
| 125325 | 5/1991 | Japan . |

*Primary Examiner*—Nasser Ahamd
*Attorney, Agent, or Firm*—Lowe, Price, LeBlanc & Becker

[57] ABSTRACT

A magnetic disk includes two kinds of texture lines formed on a substrate rendered to texturing, one kind being formed over the entire substrate and parallel with a circumference of the substrate and the other kind being formed such that a line tangent to the other texture intersects a line tangent to the one texture at an angle of 3 to 9 degrees. The other texture lines are yielded by processing the substrate with a polishing tape rocking the substrate radially thereof, and satisfying the floating characteristic of a magnetic head as being floated in a low degree, the contact-start-stop characteristic, and the attraction characteristic.

3 Claims, 6 Drawing Sheets

RATE OF TEXTURE LINES EXISTENT ON A DISK SURFACE AT THE ANGLE OF INTERSECTION OF FROM 3 TO 9 DEGREES WITH RESPECT TO THE CIRCUMFERENTIAL DIRECTION

MAGNETIC DISK

This application is a continuation of application Ser. No. 07/883,439 filed May 15, 1992, now abandoned.

BACKGROUND OF THE INVENTION

1. Field of the Invention

The present invention relates to a magnetic disk for use in a magnetic recording/regenerating device.

2. Description of the Prior Art

Prior practice commonly employs random accessible disk-shaped magnetic disks as memory means in computers, etc. Substrates of such magnetic disks generally include those of aluminum alloy, glass or plastic, etc., practically the aluminum alloy substrates chiefly.

For the aluminum alloy substrate, there is applied a base curing processing such as Ni-P plating or an anodized aluminum processing and the like. Thereafter, for finishing a disk surface into a mirror surface polishing is carried out, and for forming protrusions, on the disk surface a texturing processing is carried out. The texturing enjoys its advantage to reduce the attraction of any foreign matter by the magnetic disk and provide magnetic anisotropy to a magnetic film of the magnetic disk circumferentially. Such a magnetic disk includes on a substrate rendered to the texturing a magnetic film layer, a protective film layer, and a lubricating film layer laminated successively, which disk can be manufactured manifesting excellent characteristics: electromagnetic conversion characteristic, lifting characteristic, contact-start-stop characteristic, and attraction characteristic.

The magnetic disk drive generally employs a contact-start-stop system in which three states: rest (contact), slide, and floating are existent between a magnetic head and a magnetic disk. More specifically, the magnetic head makes contact with the magnetic disk and rests on the same when the magnetic disk is stationary, and the magnetic head and the magnetic disk make contact with each other and slide during the lower speed rotation of the magnetic disk, and further the magnetic head floats on the magnetic disk without contact, spaced away by 0.2 to 0.5 µm from the surface of the latter during stationary rotation of the magnetic disk. In the contact-start-stop system, however, it repeats the contact, slide, and floating between the magnetic head and the magnetic disk, and hence frictional characteristics between the magnetic head and the magnetic disk are increased and results in the so-called head crush where the magnetic disk or the magnetic head is broken down. To solve this, measures are taken in which a magnetic disk surface is coated with a solid lubricant or a liquid lubricant for example. There might thereupon occur a strong attraction phenomenon between the magnetic disk and the magnetic head owing to application of such a lubricant on the magnetic disk, however. The attraction phenomenon might present strong load onto the magnetic head and a flexure as a supporter for the magnetic head upon the magnetic disk drive being started in its operation to cause a damage on the magnetic head and the flexure or cause a severe scratching damage on the surface of the magnetic disk. Texturing is therefore needed to slightly apply a lubricant on the magnetic disk to the degree where there are produced no friction and wear even though the contact, start, and stop are repeated.

Prior practice of such texturing employs a polishing tape in which a lubricant is fixed and retained on a tape. The texturing can be performed by pressing a polishing tape against a magnetic disk substrate while rotating the substrate. Hereby, a texture line has protrusions with the maximum surface roughness $R_{max}$ of 0.02 to 0.1 µm, and is directed coaxially circumferentially in the running direction of the magnetic head (as disclosed in Japanese Patent Laid-Open No. 61-51619) or alternately directed in a direction deviated by 3 or more degrees of rotational angle from the circumferential direction (as disclosed in Japanese Patent Laid-Open No. 2-73516). These texturing processings are to form texture lines of one kind on the disk substrate.

Requirement is accumulated recently of increasing the capacity of recording of the magnetic disk drive device. Some methods are proposed to satisfy the need: 1) Thickness of a magnetic film layer of the magnetic disk is made thinner; 2) Coercive force Hc of a magnetic film layer of the magnetic disk is increased; 3) A gap length of the magnetic head is reduced; and 4) The degree of floating of the magnetic head is reduced; and so on. For this, the degree of floating of the magnetic head is gradually being decreased from 0.2 µm to 0.1 µm.

Such prior practice however suffers from difficulties that when a contact-start-stop test is performed with the lower degree of floating of the magnetic head of 0.1 µm, the sliding time and sliding distance of the magnetic head are increased to result in the wear of a magnetic disk surface and hence a change in the surface configuration of the magnetic disk and further that wear powder produced on the magnetic disk adheres to the magnetic head to result in head crushing.

Figure 13:
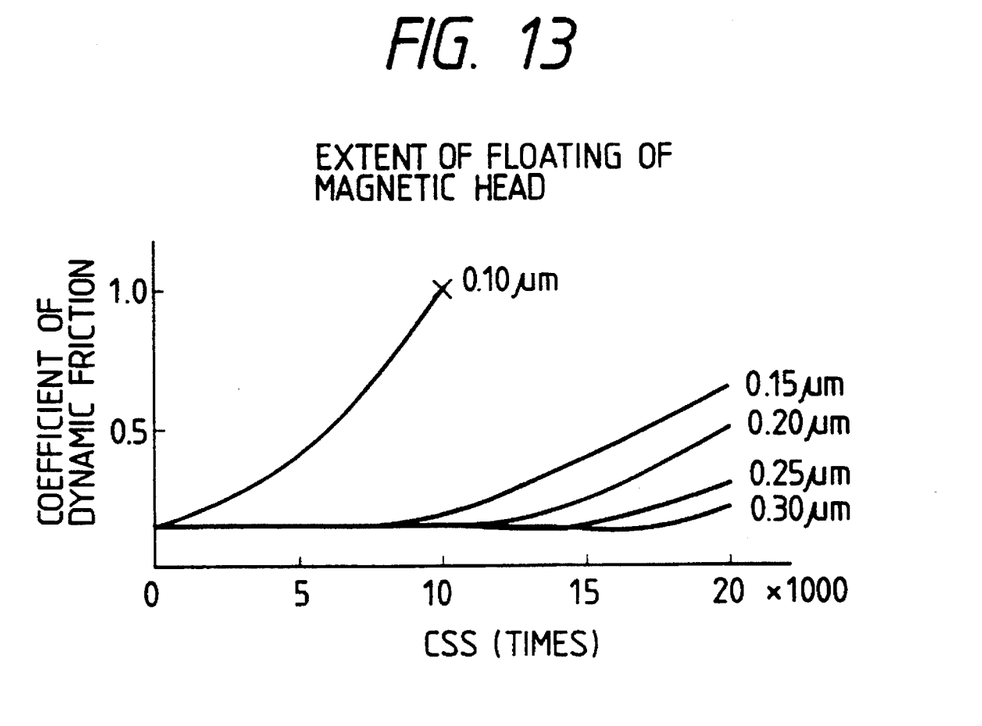
FIG. 13 is a graphical representation illustrating a relationship between the degree of floating of a magnetic head and coefficients μ of dynamic friction in a prior art magnetic disk.

Referring to FIG. 13, there are illustrated changes in the coefficients µ of dynamic friction in the contact-start-stop testing in a prior art magnetic disk as the degree of floating of the magnetic head is changed. As illustrated in the same figure, it is understood that the coefficient µ of dynamic friction steeply rises as the degree of floating of the magnetic head is reduced, to result in deterioration of the contact-start-stop characteristic.

Furthermore, there is disclosed in Japanese Patent Laid-Open No. 3-125325 another technique to form on a substrate of a magnetic disk textures intersecting in an angular range of from 0.1 to 20.0 degree, but with description only of the contact-start-stop characteristic and with no description of any improvement of the attraction characteristic as well as the floating characteristics.

SUMMARY OF THE INVENTION

To solve the difficulties with the prior art, it is an object of the present invention to provide a magnetic disk which is excellent in the floating characteristic and the attraction characteristic without deteriorating the contact-start-stop characteristic even with the lower degree of floating of the magnetic head, say 0.1 µm.

To achieve the above object, a magnetic disk of the present invention comprises, in one aspect, a substrate including two kinds of textures formed on a surface thereof and at least a magnetic thin film laminated on the surface of said substrate for recording information, one kind of said textures being formed on the surface of said substrate parallel with a circumference of the substrate, and the other of said textures being formed on the same surface of said substrate such that a line tangent to the other texture intersects a line tangent to the one texture at an angle of from 3 to 9 degrees.

In accordance with the just-mentioned magnetic disk of the present invention, the ratio of the other textures formed to the total textures ranges from 5 to 50%.

A magnetic disk of the present invention, comprises, in another aspect, a substrate, at least an intermediate layer provided on said substrate, and at least a magnetic thin film formed on said intermediate layer for recording information, said intermediate layer including two kinds of textures formed thereon, one kind of said textures being parallel with a circumference of the intermediate layer and the other being formed such a line tangent to the other texture intersects a line tangent to the one texture at an angle of from 3 to 9 degrees.

In accordance with the just-mentioned magnetic disk of the present invention, the ratio of the other textures to the entire textures ranges from 5 to 50%.

A magnetic disk of the present invention comprises, in a specific embodiment, an aluminum substrate, an Ni-P intermediate layer formed on said substrate, a Cr primary coat film formed on said intermediate layer, a magnetic thin film composed of a Co ferromagnetic material formed on said primary coat film for recording information thereon, a carbon protective film formed on said magnetic thin film for protecting the same, and a lubricating film formed on said carbon protective film for lubricating the running of a magnetic head against the magnetic disk, said intermediate layer including two kinds of textures formed thereon, one kind of the textures being parallel with a circumference of the layer and the other texture being formed such that a line tangent to the other texture intersects a line tangent to the one texture at an angle of from 3 to 9 degrees.

In accordance with the just-mentioned magnetic disk of the present invention the ratio of the other textures slanted to the total textures ranges from 5 to 50%.

DETAILED DESCRIPTION AND EMBODIMENTS OF THE INVENTION

Figure 1:
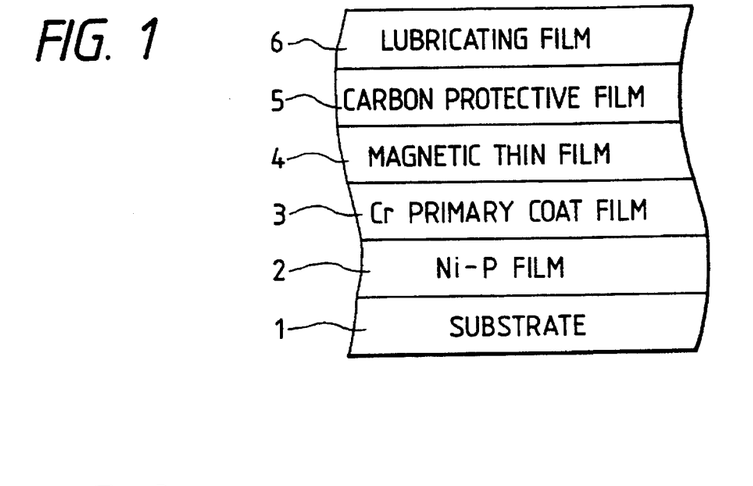
FIG. 1 is a cross section illustrating a laminate structure of a magnetic disk in an embodiment of the present invention.
Figure 2:
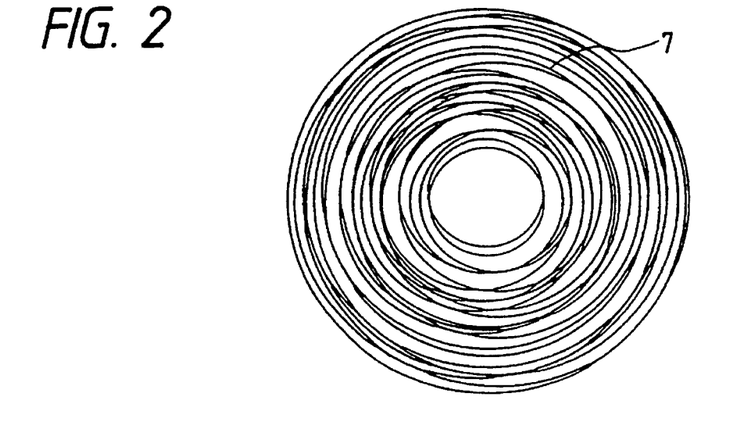
FIG. 2 is a plan view illustrating the magnetic disk in the embodiment of FIG. 1.
Figure 3:
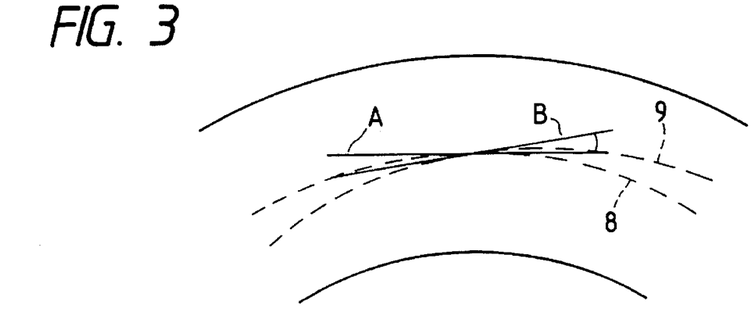
FIG. 3 is an enlarged plan view illustrating the magnetic disk in the embodiment of FIG. 1.

Referring now to FIG. 1, there is illustrated in a cross section a laminate structure of a magnetic disk in an embodiment of the present invention. As illustrated in the same figure, the laminate structure comprises an aluminum substrate 1, and an Ni-P film intermediate layer 2 formed on the substrate 1. The Ni-P film intermediate layer 2 includes textures 7 formed thereon as illustrated in FIG. 2. The textures 7 are formed with two mixed texture lines, one being parallel with a circumference of the magnetic disk and the other texture being formed such that a line tangent to the other texture intersects a line tangent to the one texture at an angle of from 3 to 9 degrees. Referring here to FIG. 3, orientations of the textures 7 are illustrated in detail. The one kind of texture line of the magnetic disk, denoted at reference number 8, forms a tangential line A at an arbitrary point on the disk while the other kind of texture line denoted at reference number 9, forms a tangential line B.

Referring again to FIG. 1, the laminate structure further comprises a Cr primary coat film 3 formed on the Ni-P film 2, a Co-Ni-Cr alloy magnetic thin film 4 formed on the Cr primary coat film 3, a carbon protective film 5 formed on the magnetic thin film, and a lubricating film 6 formed on the carbon protective film 5.

It should be noticed here that although in the above arrangement of the present embodiment the Ni-P film 2 is formed on the substrate 1, on which film 2 the textures 7 of the two kinds are formed, one being the texture line 8 and the other being the texture line 9 the textures 7 may be formed directly on the aluminum substrate 1. The Ni-P film may or may not be formed on the substrate 1 in that case. Further, although use is made of the aluminum substrate 1 in the above arrangement, a glass substrate, a plastic substrate, and a ceramic substrate, etc., may be useable, on each of which substrates such textures as described above may directly be provided. Also in cases where the substrates other than the Al substrate are employed, the textures may be formed directly on the surface of such a substrate, or alternately such an intermediate layer as described previously may be formed on the substrate on which the textures may be formed. Further, also in cases where the textures are formed directly on the substrate other than the Al substrate, the intermediate layer may or may not be formed.

Furthermore, although in the above arrangement of the present embodiment, the Cr primary coat film 3 is formed to improve the property of the magnetic thin film 4, it may not be formed.

Additionally, although in the present embodiment the magnetic thin film 4 is formed with a Co-Ni-Cr alloy, it may be of a ferromagnetic material, preferably a Co ferromagnetic material. Such Co ferromagnetic materials include, chiefly:

Co—Cr—X (herein, X is one selected among Li, Si, Co, Ti, Ta, Zr, Nb, Pt, Au, W, Ir, Re, Os, Mo, Ni, Nd, Pm, and Sm.)

Co—Ni—X (herein, X is one selected among Li, Si, Co, Ti, Ta, Zr, Nb, Pt, Au, W, Ir, Re, Os, Mo, Cr, Nd, Pm, and Sm.)

Co—W—X (herein, X is one selected among Li, Si, Co, Ti, Ta, Zr, Nb,

Pt, Au, Ir, Re, Os, Mo, Cr, Ni, Nd, Pm, and Sm.)

In the following, there will be described the manufacture of the magnetic disk arranged as above with reference to the figures. The Ni-P film 2 is formed on the Al substrate 1 into the thickness of about 20 μm by an electroless plating, and the surface of the Ni-P film 2 is polished into a mirror surface. With the substrate 1 rotated at predetermined revolutions, an alumina abrasive grain polishing tape is pressed against the substrate 1 at predetermined pressure, to form two different texture lines, one being a texture line 8 and the other being a texture line 9, as defined above. For the formation of the texture lines it is done by rocking the alumina abrasive grain polishing tape radially of the disk substrate, the roughness Ra of the magnetic disk ranges from about 2 to 8 nm.

Figure 10:
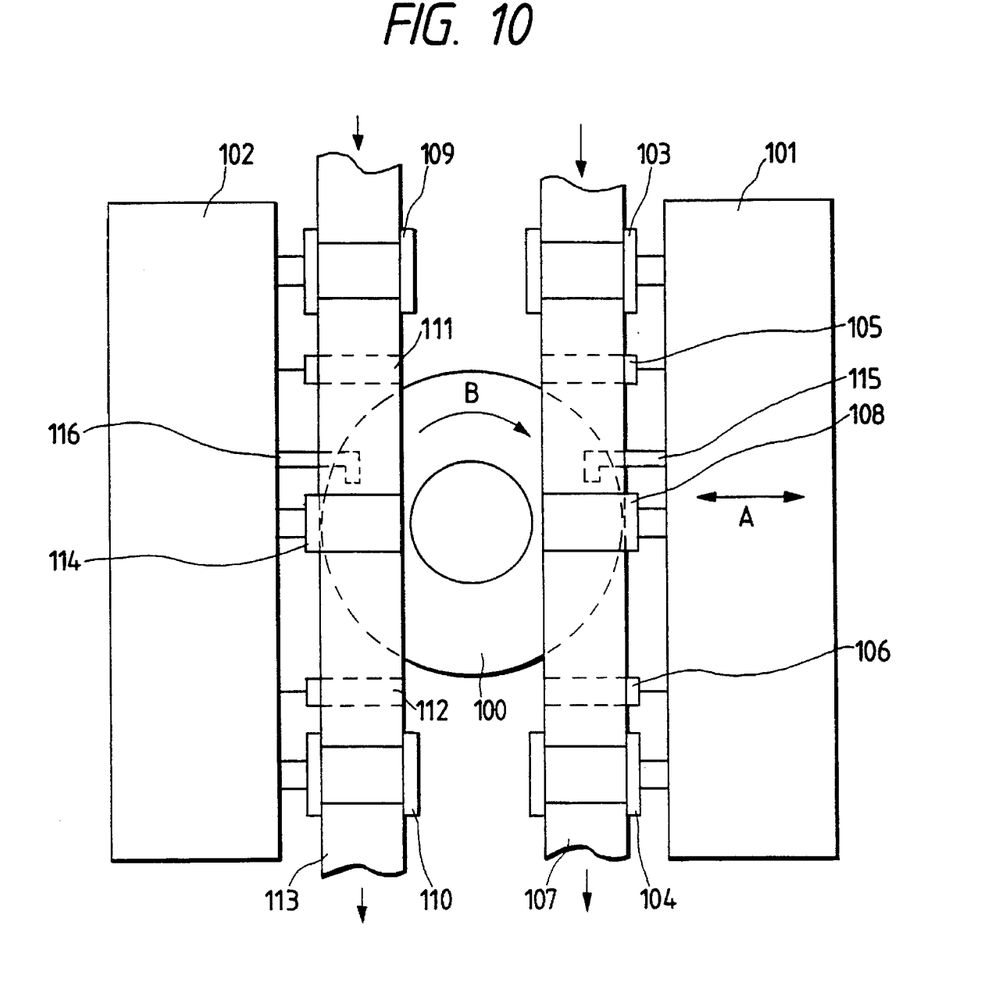
FIG. 10 is a plan view illustrating the formation of the textures.
Figure 11:
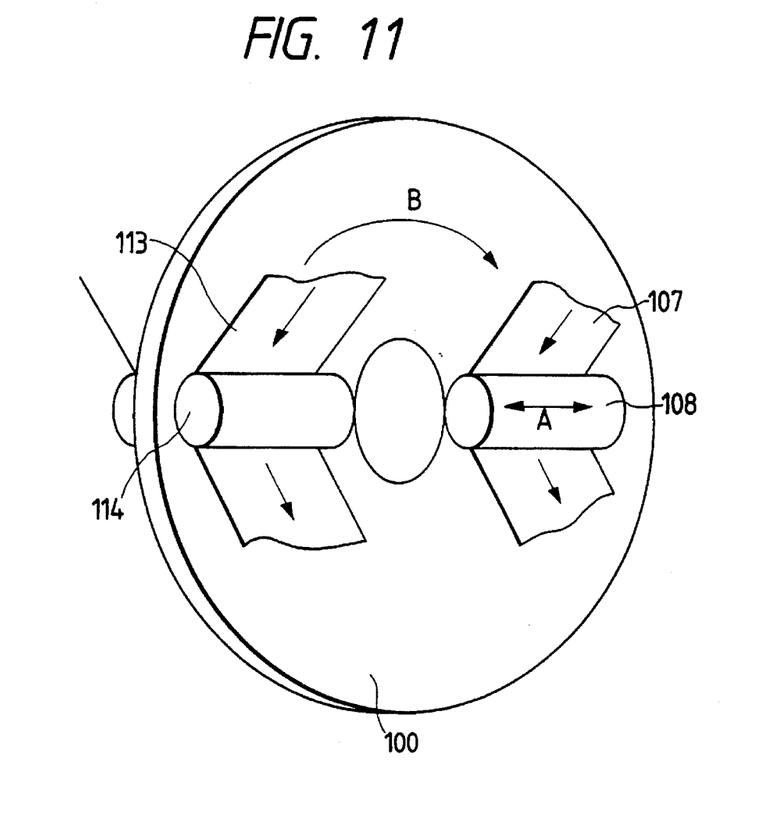
FIG. 11 is a perspective view, partly enlarged, illustrating the formation of textures.

In what follows, the formation of the textures will be described. Referring to FIGS. 10 and 11, there are illustrated the process of forming the textures on the substrate, respectively. As shown in the figures, a substrate 100 is being rotated in the direction of the arrow B. A body 101 of a texture manufacturing device includes large diameter guide rollers 103, 104 provided at opposite ends thereof. Small diameter guide rollers 105, 106 are disposed inside the guide rollers 103, 104, respectively. The polishing tape 107 is guided to a press roller 108 through the guide rollers. The press roller 108 presses the polishing tape 107 against the substrate 100 at predetermined pressure. Like the body 101, a body 102 also includes large diameter guide rollers 109, 110 provided at opposite ends thereof. Small diameter guide rollers 111, 112 are provided inside the guide rollers 109, 110. A polishing tape 113 is guided to a press roller 114 through the guide rollers. The press roller 114 presses the polishing tape 113 against the substrate 100 at predetermined pressure. The bodies 101, 102 further include nozzles 115, 116 each provided thereon for feeding a polishing fluid to contact parts between the substrate 100 and the polishing tapes 107, 113. The body 102 is stationary with respect to the substrate 100 and forms textures on the substrate 100. More specifically, a texture line formed on the substrate 100 by the body 102 is inclined by the angle of 0 degree with respect to the circumferential direction. The body 101 is moved in a reciprocating manner with respect to the substrate 100 in the direction of the arrow A in FIGS. 10 and 11. A texture line formed by the body 101 is inclined by the angle θ with respect to tangent to the circumference. The angle θ of intersection can be varied by adjusting the speed (rocking speed) of the reciprocating motion of the body 101 in the direction of the arrow A and the rotational speed of the substrate 100. An interrelation among the angle θ of intersection and those speeds is varied with processing machines used, and it is needed to adjust those parameters for each machine. In the present embodiment, the rotational speed of the substrate 100 is set to be 50–1000 rpm, for which speed the rocking speed of the body 101 is previously determined and the texture is formed on the substrate 100. The rocking speed is set to be 300 mm/min–700 mm/min in the present embodiment. The rocking speed means the mean speed estimated by measuring the time when the reciprocating motion is performed predetermined times. Further, the press roller makes contact not only with one surface of the substrate 100 but also with the other surface of the same. Hereby, the textures can be formed on the opposite surfaces of the substrate 100 only with a single processing. It should further be understood that the ratio of the one texture line and the other texture line can be changed by changing the rocking speed, the rotational speed of the substrate, and the feeding speed of the polishing tape or changing the time of contact between the body 1 and the substrate 100 and the time of contact between the body 2 and the substrate 100.

Thereafter, processing dust is thoroughly removed from the surface of the disk with use of a superfine cleaning device, and the 20 nm thick Cr primary coat film 3 is formed on the substrate of the disk by sputtering. On which film further the 60 nm thick magnetic thin film 4 is laminated using a Co-Ni-Cr alloy. Then, the 30 nm thick carbon protective film 5 is formed on the magnetic thin film 4 by sputtering carbon, on which protective film a lubricant such as perfluoro polyether as the lubricating film 6 is applied by a dipping process, a spin coating process, and a spray process, etc., to manufacture the magnetic disk.

Figure 4:
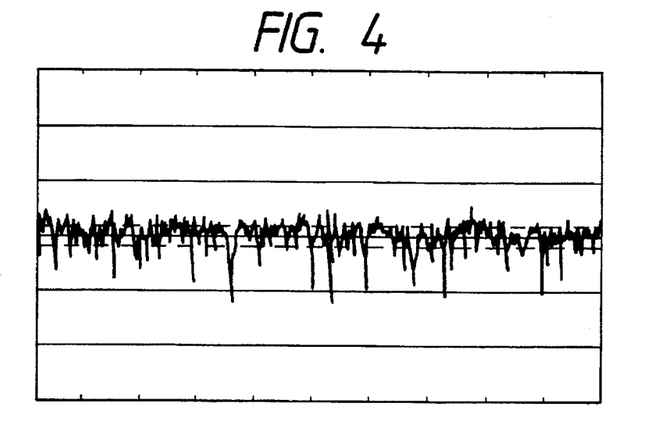
FIG. 4 is a view illustrating a profile of a texture in the present invention.
Figure 12:
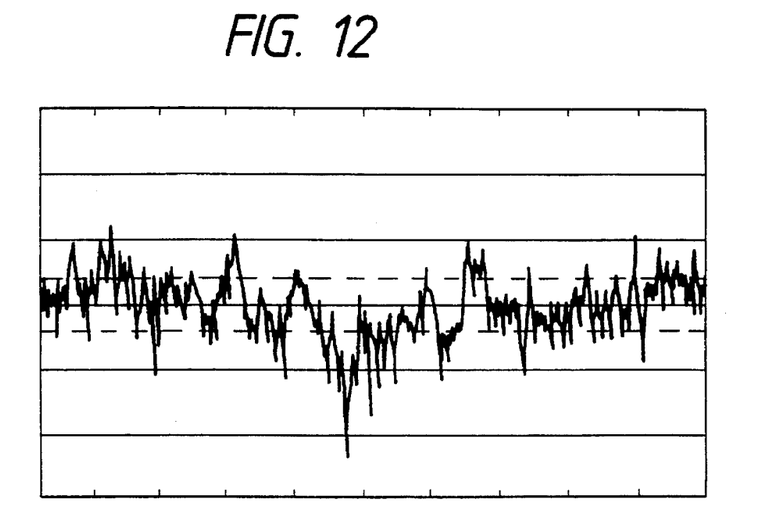
FIG. 12 is a view illustrating a profile of a texture in the prior art.

Referring here to FIGS. 12 and 4, there are illustrated, respectively, a 50 μm texture profile on the prior art magnetic disk and a 50 μm length texture profile on the magnetic disk in the present embodiment, both measured using a Taristep device (available from Lank Tailor Hobson Company which employs a 0.1 μm ×2.5 μm needle-shaped stylus) for analyzing the surface configuration and the roughness of the surface of a magnetic disk using a diamond contact finger. It is understood from the comparison of FIGS. 12 and 4 that for the surface configuration and roughness of the prior art magnetic disk illustrated in FIG. 12 and those of the magnetic disk of the present embodiment illustrated in FIG. 4 the former is severely deteriorated in the surface configuration and has the uneven height of protrusions compared with the latter. It is therefore evidenced that the magnetic disk of the present embodiment, where there are mixed two different texture lines, as defined above presents a more satisfactory surface configuration and more uniform height protrusions compared with the prior art magnetic disk.

In succession, the magnetic disk of the present embodiment is subjected to an evaluation test concerning floating characteristics, a contact-start-stop test, and an attraction test.

Figure 5:
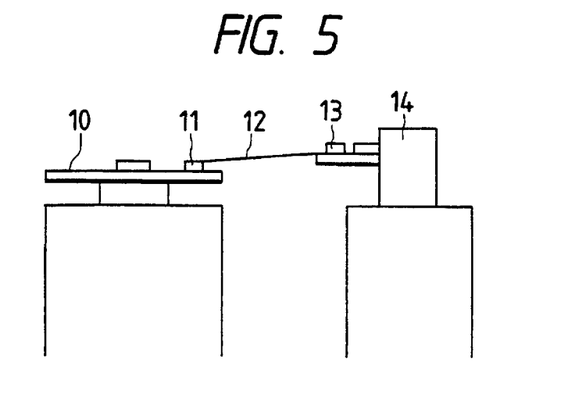
FIG. 5 is a view illustrating an experiment on glide assurance using an AE output voltage measuring device.
Figure 6:
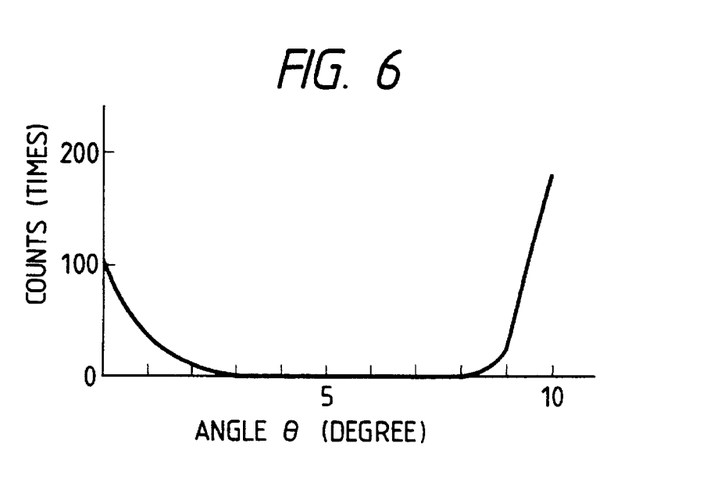
FIG. 6 is a graph illustrating an interrelation between counts of the AE output and angles O of intersection in the embodiment of FIG. 1.
Figure 7:
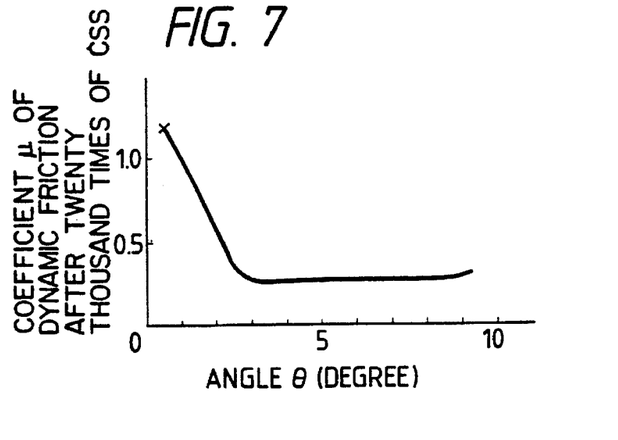
FIG. 7 is a graphical representation illustrating a relationship between coefficients μ of dynamic friction and the angles θ of intersection after twenty thousand times of contact-start-stop (CSS) operation in the embodiment of FIG. 1.

The floating characteristic evaluation is done using AE (Acoustic Emission) output voltages at the degree of the floating of 0.06 μm which provide the guaranteed glide of the magnetic head with the degree of floating of 0.1 μm. The guaranteed glide means assurance of a fact that for the predetermined degree of floating of the magnetic head it does not make contact with the magnetic disk even with the degree of floating of from 60 to 80% of the predetermined degree of floating. The AE output voltages are measured as follows: As illustrated in FIG. 5, the magnetic head 11 is forced to float on the magnetic disk 10 with the 60 to 80% degree of floating of the predetermined degree of floating. Then, an AE element 13 is mounted on the fixed part 14 of a flexure 12 being a support part of the magnetic head 11, whereby there are measured impacts applied to the magnetic head 11 and converted to voltages by the AE element 13 and the number of times of the output voltages exceeding twice or more a noise level is counted to evaluate the number of times of contacts between the magnetic head and the magnetic disk. Results are plotted in FIG. 6. In the same figure, the axis of abscissas takes the angle θ of the other textures 9 of the substrate and the axis of ordinates takes counts of the number of the voltage outputs outputted from the AE element 13 when the magnetic head is moved on the whole track. As evidenced from FIG. 6, in the case where the angle of intersection between tangents to the two different texture lines ranges from 3 degrees or higher to 9 degrees or lower, the magnetic disk surface includes no abnormal protrusion and enjoys the uniform heights of the protrusions, so that there is produced no contact between the magnetic head and the magnetic disk. Alternatively, it is considered that when the angle of intersection between the tangents to the two different texture lines is three degree or lower and 10 degrees or higher, many abnormal protrusions are formed on the magnetic disk surface with uneven heights thereof, so that the number of hits between the magnetic head and the magnetic disk is increased to result in steeply deteriorated floating characteristics.

Figure 8:
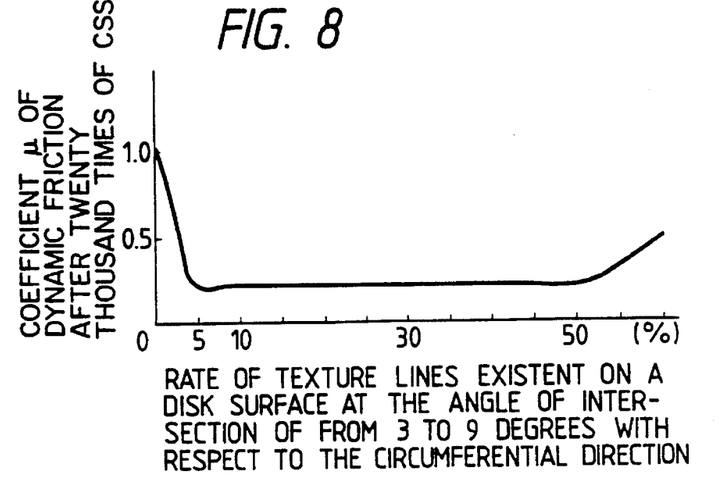
FIG. 8 is a graphical representation illustrating a relationship between the rates of texture lines existent on a disk surface at angles of from 3 to 9 degrees with respect to the circumferential tangent of the disk and the coefficients μ of dynamic friction after twenty thousand times of the contact-start-stop (CSS) operation.

The contact-start-stop test is conducted using a magnetic head of the degree of floating of 0.1 µm. Contact-start-stop is repeated twenty thousand times under the conditions of the magnetic disk: radius 25–30 mm and the number of revolutions 3,600 rpm, and thereafter the coefficients µ of dynamic friction are measured. FIG. 8 illustrates the results. As evidenced from the same figure, for the magnetic disk with the angle θ of intersection between tangents to the two different texture lines being lower than 3 degrees, the coefficient µ of dynamic friction after twenty thousand times of the contact-start-stop exceeds 0.6, with the result of unsatisfactory contact-start-stop characteristics in the magnetic disk of the low degree of floating of 0.1 µm. Against this, for the magnetic disk with the angle θ of intersection of the tangents being higher than 3 degrees, the coefficient µ of dynamic friction after twenty thousand times of the contact-start-stop is 0.25 or lower, with the result of satisfactory contact-start-stop characteristics even in the magnetic disk of the low degree of floating of 0.1 µm. Referring to FIG. 8, there is illustrated a relationship in a similar experiment between the rate (number) of the texture lines existent on a magnetic disk at the angle of intersection of the tangents of from 3 to 9 degrees and the coefficient µ of dynamic friction after twenty thousand times of the contact-start-stop. It is understood from the figure that the coefficient µ of dynamic friction is kept substantially unchanged in the range of from 5 to 50% in the rate of the texture lines 9 on the magnetic disk and the coefficient µ is increased outside the foregoing range. It is therefore evidenced that the ratio of the other texture lines existent on the disk surface ranges between 5% and 50%.

Figure 9:
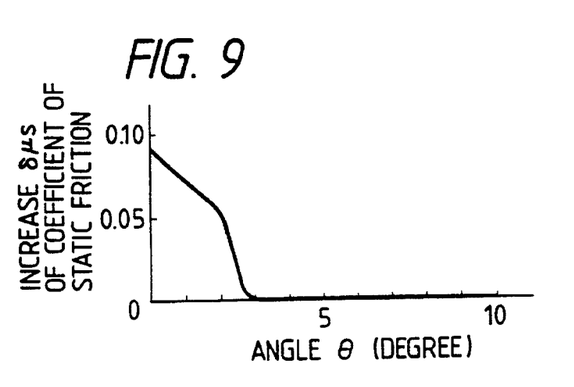
FIG. 9 is a graphical representation illustrating a relationship between the increase δμζ of the coefficient of static friction and the angles θ of intersection between the texture lines in the embodiment of FIG. 1.

For the attraction test, a thermostat is used and is left behind for 24 hours in the environment of high temperature and high humidity (temperature 60° C., humidity 80%) and thereafter an increase δµζ of the coefficient of static friction is measured. A magnetic head used is a ferrite monolithic miniature slider with the radius of measurement of 45 mm. FIG. 9 illustrates result of the measurement. It is evidenced from the figure that with the angle θ of intersection between the two different texture lines being lower than 3 degrees, the increase δµζ of the coefficient of dynamic friction exhibits a higher attraction of 0.05 or more, while with the angle θ of intersection between the two different texture lines being over 3 degree, the degree of increase δµζ is 0 with a result of no attraction between the magnetic head and the magnetic disk.

From the aforementioned results of the floating characteristic evaluation, contact-start-stop test, and attraction test, it is clarified that a magnetic disk including the two different texture lines, one being parallel with a circumference of the magnetic disk and the other being formed such that a line tangent to the other texture intersects a line tangent to the one texture at an angle of from 3 to 9 degrees, most satisfies the floating characteristic in the magnetic head being floated in a low degree, contact-start-stop characteristic, and attraction characteristic.

According to the present embodiment, as described above, the texture of the present invention is formed by mixing the two different texture lines, other one texture line 8 being parallel with a circumference of the disk and the other texture line 9 being formed such that a line tangent to said other texture intersects a line tangent to said one texture at an angle of from 3 to 9 degrees, as shown in FIG. 3. It is therefore possible to provide a magnetic disk improved in various characteristics compared with the prior art such that the surface roughness Ra is smaller as being 2 nm to 8 nm and the protrusions on the magnetic disk surface are uniform in height with innumerable fine protrusions formed on the foregoing protrusions. Further, there are mixed the two different texture lines, as defined above, and the ratio of the other texture lines to the total texture lines is set to be 5% to 50%. Hereby, the floating characteristic of the magnetic head as being floated in a low degree, the contact-start-stop characteristics, and the attraction characteristic can be improved.

According to the present invention, a magnetic disk is provided, including a magnetic disk substrate on which textures are formed, a magnetic thin film as a recording medium formed on said substrate, and a protective film formed on said magnetic thin film, said texture being formed with the two kinds of mixed texture lines, as described above. It is therefore possible to eliminate the production of abnormal protrusions and make uniform the top configuration of the protrusions. It is accordingly possible to improve the floating characteristic of the magnetic head as being floated in a low degree, the contact-start-stop characteristics, and the attraction characteristic.

What is claimed is:

1. A magnetic disk comprising:
   a substrate including two kinds of textures formed on a surface thereof, and
   at least a magnetic thin film laminated on the surface of said substrate for storing information,
   one of said two kinds of textures being formed over the entire surface of said substrate and parallel with a circumference of the substrate,
   the other of said two kinds of textures being formed on the same surface of said substrate such that a line tangent to the other texture intersects a line tangent to the one texture at an angle of 3 to 9 degrees, and
   the ratio of the other textures to the total textures ranging from 5 to 50%.

2. A magnetic disk comprising:
   a substrate,
   at least an intermediate layer provided on said substrate, and at least a magnetic thin film formed on said intermediate layer, said intermediate layer including two kinds of textures formed on a surface thereof, one of said two kinds of textures being formed over the entire surface of the intermediate layer and parallel with a circumference of said intermediate layer, the other of said two textures being formed such that a line tangent to the other texture intersects a line tangent to the one texture at an angle of 3 to 9 degrees, and the ratio of the other textures to the total textures ranging from 5 to 50%.

3. A magnetic disk comprising:

an aluminum substrate, an Ni-P intermediate layer formed on said substrate, a Cr primary coat film formed on said intermediate layer, a magnetic thin film composed of a Co ferromagnetic material formed on said primary coat film for recording information thereon, a carbon protective film formed on said magnetic thin film for protecting said magnetic thin film, and a lubricating film formed on said carbon protective film, said intermediate layer including two kinds of textures formed on a surface thereof, one of said two kinds of textures being formed over the entire surface of the intermediate layer and parallel with a circumference of said intermediate layer, the other of said two kinds of textures being formed such that a line tangent to the other texture intersects a line tangent to the one texture at an angle of 3 to 9 degrees, and the ratio of the other textures to the total textures ranging from 5 to 50%.

* * * * *